United States Patent [19]

Gilst

[11] 4,147,132
[45] Apr. 3, 1979

[54] PIG NURSERY FEEDER

[75] Inventor: Carl V. Gilst, Goshen, Ind.

[73] Assignee: AG Best, Inc., Syracuse, Ind.

[21] Appl. No.: 762,515

[22] Filed: Jan. 26, 1977

[51] Int. Cl.² ............................................. A01K 5/00
[52] U.S. Cl. ................................................... 119/53
[58] Field of Search .................... 119/52 R, 53, 53.5, 119/54, 57, 58

[56] References Cited

U.S. PATENT DOCUMENTS

| | | | |
|---|---|---|---|
| 1,336,320 | 4/1920 | Schumacher | 119/54 |
| 1,572,981 | 2/1926 | Aldrich et al. | 119/56 R |
| 2,111,950 | 3/1938 | Thiemann | 119/53 |
| 2,485,173 | 10/1949 | Smucker | 119/57 |
| 2,933,064 | 4/1960 | Geerlings | 119/53 |

Primary Examiner—Hugh R. Chamblee
Attorney, Agent, or Firm—Craig & Antonelli

[57] ABSTRACT

A pig nursery feeder is provided which has an overall box-shaped configuration and is made substantially of steel plates welded to one another. The upper section of the feeder which constitutes the major feed storage volume thereof, includes tapered lower side walls which converge to form a decreasing cross-sectional area in the downward direction. Feed openings are provided at the bottom of the lower section of the feeder. At an intermediate section at the upper part of the lower section, the side walls of the feeder converge outwardly so as to present an increasing cross-section expanded throat portion for promoting free flow of the feed into the lower portion and to the feeder openings. To accommodate adjustment of the openings, the slide panels are connected to hand operable cranks disposed at the top of the feeder so that the feeder opening adjustments can be made independently of the amount of feed in the feeder and independently of any separate tools.

18 Claims, 2 Drawing Figures

PIG NURSERY FEEDER

BACKGROUND AND SUMMARY OF THE INVENTION

The present invention relates to a pig nursery feeder of the type used for feeding small pigs, preferably small pigs weighing in the range of 15 to 40 pounds. With relatively finely ground dry feed, of the type which may be fed to small pigs, automatic gravity fed nursery feeders of known construction have exhibited difficulties in that the feed becomes packed and feed "bridges" are formed in the feeder preventing free feed flow to the bottom openings. When such feed bridging occurs, one can use a shovel or stick or other device to break the feed up and again initiate the free feed flow. However, apart from the disadvantages associated with the manual labor involved, such arrangements also exhibit the danger that the feed flow to the pigs will be shut off for some time unless the pig handler continuously monitors the feeders. Such a continuous monitoring program is exactly what is intended to be avoided by automatic feeders and, therefore, this solution is certainly satisfactory.

It has also been contemplated to provide pig feeders having agitating apparatus or the like arranged within the feeder to assure the free flow of feed. However, such agitating apparatus requires excessive expenditures for its manufacture and operation. Although there have also been arrangements contemplated wherein agitating apparatus operable by the pigs themselves is used, such agitating apparatus not only substantially increases the cost of manufacture of the feeders, it also results in additional maintenance and repair costs, not to mention shut off of the feed supply in the event it comes into disrepair during use or does not operate as intended. Further, a small pig (20 to 40 pounds) cannot readily work an agitator because its nose is not tough enough to withstand the effort.

Prior art nursery feeder arrangements have also exhibited difficulties in the adjustment of the feeder openings which are arranged at the bottom of the feeder to accommodate the gravity flow of the feed therethrough. In many instances the feed openings need to be adjusted due to changes in the feed flow caused by emptying of the feeder. If the feed mix or ground particle size of the feed is being altered, the feeder openings could be adjusted with an empty feeder. However, in practical usage, it would be much better if the feeder openings were adjustable without undue effort even with a completely full feeder. For example, changing ambient weather conditions, with increases in air moisture content, can cause the feed to become less flowable and thereby require a larger opening. Also, depending upon the size, number and activity of the pigs using the feeder, different size openings may be required to assure a proper flow of feed. Further, when one changes from one batch of feed to the next, even assuming that one makes a preliminary adjustment while the feeder is empty to accommodate the new mixture to be supplied, an accurate operable in use adjustment may still have to be made after the feeder has been filled in order to optimize the feed flow. Further, depending upon how full the feeder is, the gravity forces acting on the feed at the bottom of the feeder near the opening is affected such that adjustments may be desired or required during the emptying of the feeder by the pigs.

Although it has been contemplated to provide feeder opening adjusting means that can be adjusted even with a full nursery feeder, such prior arrangements have, for the most part, required special tools and/or complex construction to accommodate this adjustment.

The present invention is directed, at least in part, to overcoming the above-noted problems in pig nursery feeders. According to an important feature of the present invention, the above-noted problem regarding packing or bridging of feed is solved by providing an expanded throat section in the area of the bottom of the feeder, which expanded throat section facilitates the free flow of feed to the feeder openings and prevents the so-called "feed bridging." According to preferred embodiments of the invention, the expanded throat section is constructed with an increasing cross-sectional area in a downward direction starting from the bottom part of an upper feeder section which stores most of the feed in the feeder, which bottom part has diverging walls so as to form a minimum feeder cross-section at the point where the diverging throat section starts.

In preferred embodiments of the invention, the feeder is constructed in a rectangular box-shape with steel panel members welded to one another. The diverging throat section is formed by bending a side panel member so as to extend substantially vertically at the upper portion of the feeder, diverge inwardly toward the vertical center plane of the feeder to a point at the minimum feeder cross-section, where the panel is then bent back upon itself to converge outwardly from the center plane of the feeder.

Another important feature of the present invention relates to the above-noted problem regarding adjustment of the feeder openings with or without feed in the feeder. According to the invention, an adjusting mechanism is provided which includes manually operable crank handles disposed at the top of the feeder so that the adjustments can be made independently of the amount of feed in the feeder and independently of any separate tools. According to a preferred embodiment of the invention, crank handles and connecting rods are provided at respective opposite ends of the feeder which are attached to the slides controlling the feeder openings also at the respective opposite ends of the feeder so as to accommodate adjustment in the vertical direction of both ends of the slide member independently. This preferred embodiment exhibits advantageous adjustment possibilities as noted, as well as a stable support of the slide members at both ends. The slide members are suspended from the crank and rod adjusting system.

According to preferred embodiments of the invention, the feeder spaces for accommodating feeding of the pigs at the feeder are disposed and partitioned to help prevent the pigs from throwing the feed sideways and out. Also, the preferred embodiments of the invention include a special step-back feeder design which keeps manure from dropping into the trough or feeder spaces.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
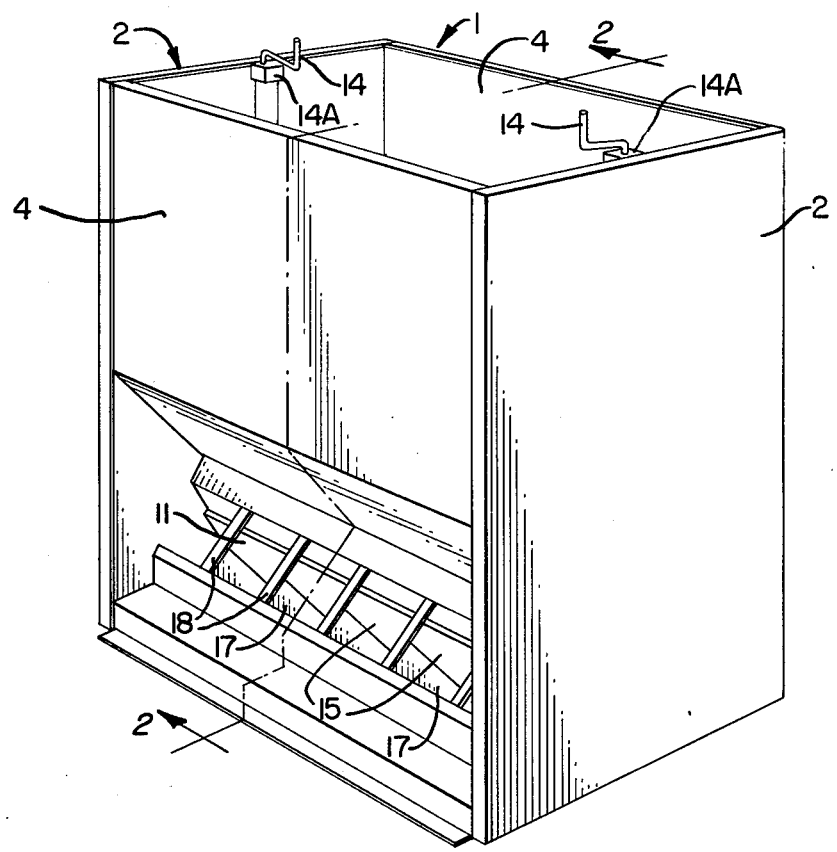
FIG. 1 is a perspective view from above showing a pig nursery feeder constructed in accordance with the present invention.
Figure 2:
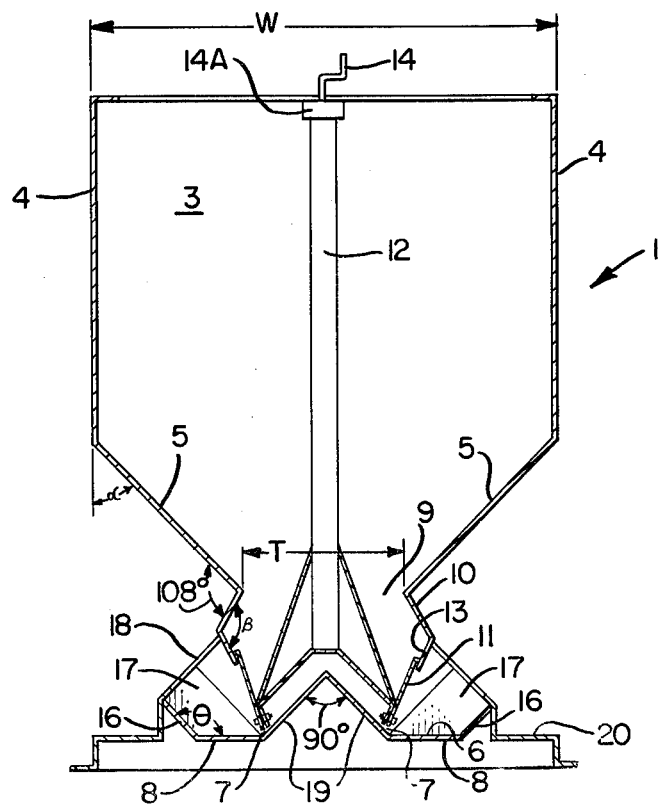
FIG. 2 is a schematic sectional view taken along line II—II of FIG. 1

Pig nursery feeder 1 includes rectangular shaped steel panel end walls 2 which extend vertically and parallel to one another. The feed storing space in the feeder 1 includes an upper section 3 which is bounded at the upper part thereof by rectangular parallel facing side walls 4 and at the lower portion thereof by inwardly tapering side walls 5. The side walls 4 and 5 are symmetrically arranged with respect to a vertical plane bisecting the feeder in the longitudinal direction thereof.

The feed space in the feeder includes a bottom section 6 which has openings 7 for permitting gravity feeding of the feed in the feed space to the feed trough floors 8 where the pigs will be able to eat the feed. Intermediate the extreme lower section 6 and the upper section 3 there is an intermediate section 9 bounded by wall sections 10 which converge laterally outwardly away from the center plane to form an expanded throat for passage of the feed from the upper section 3 to the lower section 6. The provision of the expanded throat intermediate section permits the free flow of feed from the upper space 3, without feed bridges being formed, apparently because of the reduced pressure in this section 9 which acts to eliminate packing in the throat area.

The feed openings 7 are controlled in size by slide members 11 which are attached to and moveable with adjusting rods 12. To aid in guiding the movement of these slide members 11, the extreme lower end sections 13 of the side walls 4, 5, 10 are provided with guides in the form of inter-engaging slot structure.

The adjusting rods 12, and therewith the slide members 11, are moved by rotation of crank 14 which is screw threadedly connected with rod 12 and is attached at the upper portion of the feeder end walls 2 by a bearing block assembly permitting rotation of the crank 14 relative to the rods 12.

The side wall sections 4, 5, 10, 13 are formed by single panels of sheet metal which are bent respectively at the junction of each of these sections so as to form a continuous inwardly facing wall structure for the feed to slide upon.

The feeding spaces 15 for the pigs to gain access to the feeding floor sections 8 are delimited by the floors 8 and upwardly and outwardly angled side wall sections 16. In addition, partition sheet metal parts 17 are disposed intermediate each of the feed spaces 15 to prevent the pigs from throwing the feed sideways and out of the trough area. Reinforcing strap members 18 are also provided intermediate each of the feeder spaces 15, which straps 18 are welded to the outside of the wall sections 13 at the top and to a bent-over sheet panel member forming the side walls 16 for the trough at the bottom. The partitions 17 are in turn welded to these support straps 18 at their upper end and to the floor 8 at their lower end.

The bottom of the lower section 6 of the feeder is bounded in the central portion by tapered feeder floor sections 19, which are tapered so as to slope from a peak at the center line of the feeder downwardly and outwardly to the feed openings 6 so as to assist in self-feeding flow of the feed out of the feeder.

The feeder spaces 16 are offset inwardly toward the center plane of the feeder by a distance D, with a pig step 20 being formed along this distance D for accommodating the front feet of the pigs while feeding. By setting back the feeder spaces and providing the pig step 20 as shown, manure is kept from dropping into the trough. Also, the insert of the openings to the feeder spaces 15 underneath the contours of the upper portion assist in forming a type of cover or umbrella to prevent rain, snow and the like from getting on the feed by way of the spaces 15.

In preferred embodiments of the invention, the panel and floor members are formed of welded 14-gauge steel construction with a special lacquer surface so as to withstand the elements and so as to aid in the free sliding of the feed along the internal walls. In order to accommodate the size of 15–40 pound pigs, a preferred dimension for a preferred embodiment of the invention, with an 11-bushel capacity, is as follows: overall height—3 feet, overall length—3 feet, and width—2 feet.

In the preferred illustrated embodiment, the width w is 24"; throat width T is $8\frac{1}{2}$"; angle $\alpha$ is a maximum and optimum of 45° and a minimum of 30°; angle $\beta$ is 135°; angle $\theta$ is 135°; and other angles are as depicted.

In preferred embodiments the side walls 16, floors 8, and feeder floor section 19 are formed of a single continuous piece of sheet metal appropriately bent to the configuration illustrated and described. A downwardly open space is provided under this sheet metal piece forming walls 16, floors 8 and floor section 19.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Animal feeder apparatus comprising:
   an upper feeder portion for storing animal feed, said upper feeder portion being bounded by upper side wall means,
   an intermediate feeder portion disposed immediately below said upper feeder portion, said intermediate feeder portion being bounded by intermediate side wall means connected to the bottom of the upper side wall means, said intermediate side wall means diverging laterally outwardly in the downward direction with respect to a vertical plane through the feeder apparatus so that said intermediate portion exhibits an increasing cross-sectional area in the downward direction to form an expanded throat for promoting free flow of said feed therethrough,
   a lower feeder portion communicating directly with feed opening means accommodating consumption of the feed by animals with an automatic gravity aided passage of feed from said upper portion through said intermediate portion to said lower portion and said feed opening means in response to consumption of the feed by the animals, said lower feeder portion being bounded at the bottom by bottom wall means which extend laterally outwardly in the downward direction with respect to said vertical plane, said bottom wall means and said intermediate side wall means being disposed to face one another to form a feed passage therebetween upstream of the feed opening means, which feed passage extends laterally outwardly in the downward direction with respect to the vertical plane, said lower feeder portion being bounded at the sides by lower converging side wall means connected with said intermediate side wall means and by movable slide member means mounted to slide along said lower side wall means, said feed opening means being formed between the bottom wall means and the bottom of said slide member means, and feed opening adjustment means for adjustably moving the slide member means to adjust the size of the feed opening means.

2. Apparatus according to claim 1, wherein the lower part of said upper portion exhibits a decreasing cross-sectional area in the downward direction.

3. Apparatus according to claim 1, wherein said feed opening adjustment means includes manually operable crank means disposed at the top of said upper portion for accommodating simple manual adjustment of said feed openings independently of the amount of feed in the apparatus and independently of any separate tools.

4. Apparatus according to claim 1, wherein said upper portion has a substantially greater volume than said lower portion.

5. Apparatus according to claim 1, wherein said feed opening means includes feed openings at respective opposite lateral sides of a vertical center plane bisecting said upper and lower portions.

6. Apparatus according to claim 5, wherein said feed opening adjustment means includes manually operable crank means disposed at the top of said upper portion for accommodating simple manual adjustment of said feed openings independently of the amount of feed in the apparatus and independently of any separate tools.

7. Apparatus according to claim 6, wherein said movable slide member means are movably operably connected with said crank means.

8. Apparatus according to claim 1, wherein feeder space openings for accommodating access to the feed by the pigs are set back from the outer confines of the upper portion of the feeder apparatus in order to minimize soiling of the feed by weather elements and the like.

9. Apparatus according to claim 8, wherein a step for front feet of pigs extends from the feeder space openings to a position aligned with the outer confines of the upper portion of the feeder apparatus.

10. Apparatus according to claim 1, wherein the walls forming the upper, lower, and intermediate portions are made of sheet metal and are welded to one another.

11. Apparatus according to claim 1, wherein said feed opening means includes feed openings at respective opposite lateral sides of a vertical center plane bisecting said upper and lower portions, and wherein said feeder apparatus is constructed symmetrically with respect to said vertical center plane.

12. Apparatus according to claim 11, wherein said feed opening adjustment means includes a pair of manually operable crank means disposed at the top of said upper portion and connected to respective opposite ends of said movable slide member means, said slide member means including slide members at both sides of said vertical plane which are connected to lower extensions of said crank means.

13. Apparatus according to claim 12, wherein said crank means are rotatably bearingly supported at respective opposite end walls of said feeder apparatus, said end walls bounding said upper, intermediate, and lower feeder portions.

14. Apparatus according to claim 13, wherein a plurality of aligned separate animal feeder space openings are provided for accommodating animal access to feed passing through the feed opening means, said feeder space openings being separated from one another by sheet metal partitions extending upwardly from a floor part of said lower feeder portion.

15. Apparatus according to claim 14, wherein a step for front feet of pigs extends from the feeder space openings to a position aligned with the outer confines of the upper portion of the feeder apparatus.

16. Apparatus according to claim 1, wherein a plurality of aligned separate animal feeder space openings are provided for accommodating animal access to feed passing through the feed opening means, said feeder space openings being separated from one another by sheet metal partitions extending upwardly from a floor part of said lower feeder portion.

17. Apparatus according to claim 16, wherein sheet metal strap means are also provided between each of said feeder space openings to help hold said sheet metal partitions in place.

18. Apparatus according to claim 1, wherein said bottom wall means and said intermediate side wall means extend at an angle no more than 15° with respect to one another.

* * * * *